UNITED STATES PATENT OFFICE.

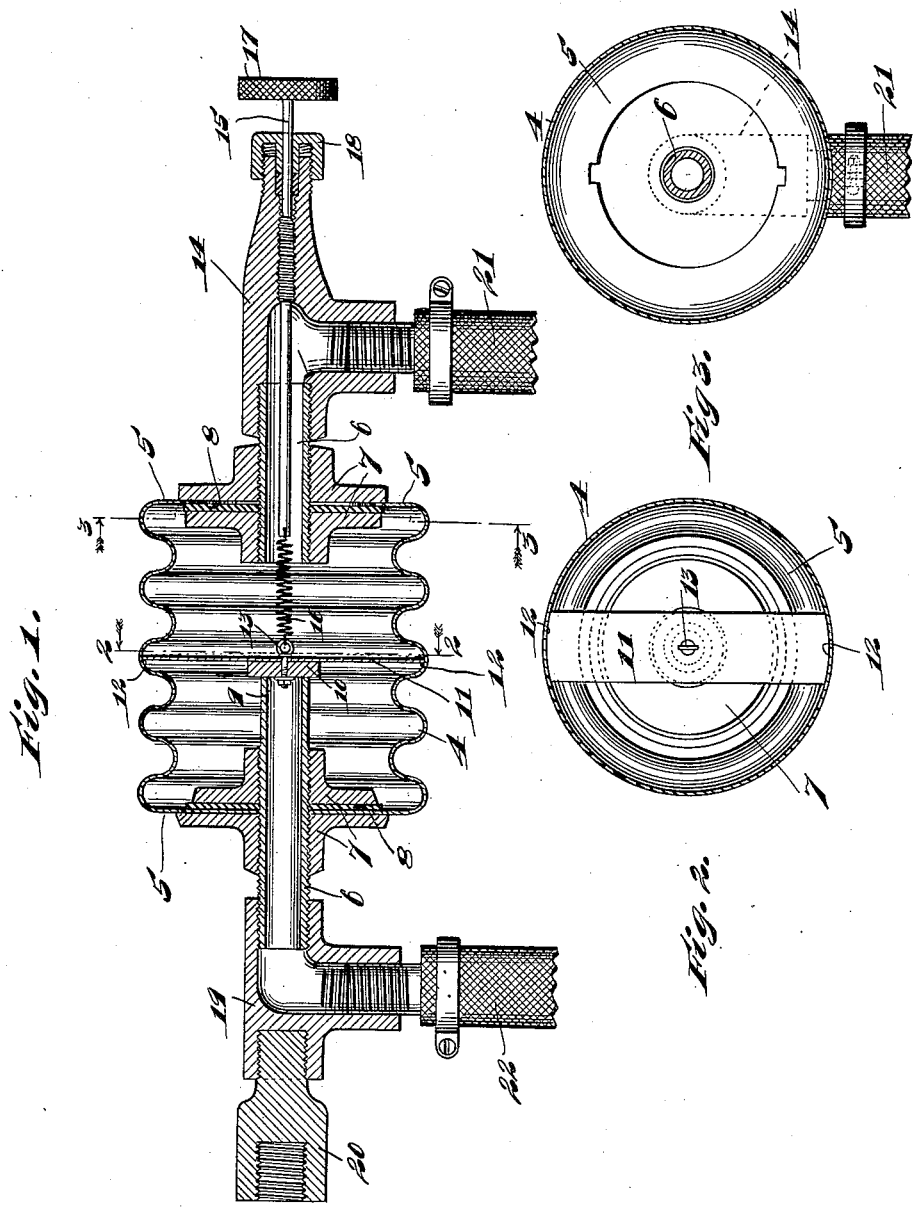

ELMER LOUIS BISSON, OF BERWYN, ILLINOIS.

VIBRATOR.

1,096,092.     Specification of Letters Patent.     Patented May 12, 1914.

Application filed September 2, 1913. Serial No. 787,700.

*To all whom it may concern:*

Be it known that I, ELMER L. BISSON, a citizen of the United States, and a resident of the city of Berwyn, county of Cook, and State of Illinois, have invented certain new and useful Improvements in Vibrators, of which the following is a specification.

My invention relates to vibrators and more particularly to fluid operable vibration producing devices.

The object of this improvement is to provide a simple and effective device of the kind mentioned operable by a fluid under pressure for the production of vibratory movements such as are necessary in the operation of certain massaging instruments or other instruments where a vibratory movement is required.

Other objects will appear hereinafter.

The invention consists in the combinations and arrangements of parts hereinafter described and claimed.

The invention will be best understood by reference to the accompanying drawing forming a part of this specification, and in which, Figure 1 is a longitudinal section of a vibration producing device embodying my invention, Fig. 2 is a section of the same taken on line 2—2 in Fig. 1, and Fig. 3 is a similar view taken on line 3—3 in Fig. 1.

The preferred form of construction as illustrated in the accompanying drawings comprises a circular corrugated wall 4 having parallel ends 5. The ends 5 are provided with axial openings in which are fitted nipples 6. On each of the nipples 6 are threaded two nuts 7 one on the inner side and one on the outer side of each end 5. Between one of the nuts 7 and its corresponding end 5 is a gasket 8 providing a means for effectively sealing the joint between such nut and its corresponding end.

One of the nipples 6 is provided with a valve seat 9 at its inner end and resting against the valve seat is a valve 10 held in position by means of a flat spring 11. The ends of the flat spring 11 engage corrugations of the corrugated casing 4 as at 12 and effectively maintain the valve 10 normally against its seat 9. Threaded through the valve 9 and flat spring 11 is an eye bolt 13 securing the valve to the spring. On one of the nipples 6 is threaded a fitting 14. The fitting 14 is provided with a threaded stem 15 threaded in the axial center of the fitting 14, and passed through corresponding nipple 6 and casing 4. The threaded stem 15 is connected with the eye bolt 13 by means of a tension spring 16. A head 17 is provided on the threaded stem 15 for effecting adjustment of said threaded stem in the fitting 14 to produce less or greater tension on the spring 11. The outer end of fitting 14 is provided with a stuffing box 18 forming a fluid tight joint between the outer end of fitting 14 and threaded stem 15. The other nipple 6 is provided with a fitting 19 threaded thereon and in the end of fitting 19 is a work-holding member 20 adapted to receive a massaging instrument or any other device which it is desired to operate.

In use, a hose 21 or other form of supply pipe is connected with the fitting 14 to introduce a supply of a fluid under pressure through fitting 14 and one nipple 6 to the chamber in housing 4. The fitting 19 is connected with a waste pipe 22 of any convenient construction and adapted to carry off the fluid after its use.

The corrugated casing 4 is preferably formed of a thin resilient metal such as spring bronze or any other suitable material. By making the casing 4 of a thin resilient material the pressure of fluid in the chamber inclosed by said casing effects slight longitudinal flexing of said casing. This longitudinal movement permits the valve to be raised from its seat 9 permitting fluid to pass between the valve and its seat and out through waste pipe 22. As soon as the pressure is reduced on the casing 4, it contracts again of its own resiliency, thereby closing the valve 10 against its seat again. The flexing of the casing 4 causes a longitudinal movement of the instrument holder 20 and the parts connecting it with the casing. The valve 10 only opens slightly thereby causing a great number of openings and closings in a short time, and thereby causing a quick vibrating movement of the holder 20. The frequency and length of the vibration of said valve 10 may be varied at will by adjusting threaded stem 15 in fitting 14 to vary the tension of springs 11 and 16 as will be readily understood.

While I have illustrated and described the preferred form of construction for carrying my invention into effect, this is capable of variation and modification without departing from the spirit of my invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A vibrator comprising a longitudinally extensible casing having intake and exhaust fluid openings therein; and a vibrating valve in said casing, substantially as described.

2. A vibrator comprising a longitudinally extensible casing having fluid inlet and outlet openings therein; a valve seat around said fluid outlet; and a valve resiliently maintained against said valve seat, substantially as described.

3. A vibrator comprising a longitudinally extensible casing having fluid inlet and outlet openings therein; a valve seat around said fluid outlet; a resilient member carried by and extending laterally through said casing; and a valve carried by said resilient member and engaging said valve seat, substantially as described.

4. A vibrator comprising a longitudinally extensible casing having fluid inlet and outlet openings therein; a valve seat around said fluid outlet; a resilient member carried by and extending laterally through said casing; a valve carried by said resilient member and engaging said valve seat; and a tension spring adjustably connected with said valve, substantially as described.

5. A vibrator comprising a casing; hollow fittings secured in the ends of said casing; a valve seat on one of said fittings; a resilient member extending laterally through said casing and having its ends engaging the sides thereof; a valve carried by said resilient member and seated against said valve seat; and a tension spring adjustably connecting said valve with the other of said fittings, substantially as described.

6. A vibrator comprising a corrugated tubular longitudinally extensible casing having alining openings in its ends; hollow fittings secured in said openings; a valve seat on one of said fittings; a resilient bar disposed laterally through said casing with its ends engaging one of the corrugations thereof; a valve seated on said valve seat and secured to the central portion of said resilient member; a screw threaded in said other fittings; and a tension spring connecting said valve with said screw, substantially as described.

In testimony whereof I have signed my name to this specification in the presence of two subscribing witnesses.

ELMER LOUIS BISSON.

Witnesses:
 MARIE CALLAGHAN,
 HELEN F. LILLIS.

---

Copies of this patent may be obtained for five cents each, by addressing the "Commissioner of Patents, Washington, D. C."